(12) United States Patent
Wu et al.

(10) Patent No.: US 7,599,146 B2
(45) Date of Patent: Oct. 6, 2009

(54) SUPPORT STRUCTURE OF STORAGE DEVICE FOR PORTABLE ELECTRONIC DEVICE

(75) Inventors: Hung-Bin Wu, Taipei (TW); Chung-Chi Chien, Taipei (TW)

(73) Assignee: Compal Electronics, Inc., Taipei (TW)

( * ) Notice: Subject to any disclaimer, the term of this patent is extended or adjusted under 35 U.S.C. 154(b) by 631 days.

(21) Appl. No.: 11/161,590

(22) Filed: Aug. 9, 2005

(65) Prior Publication Data

US 2006/0232877 A1 Oct. 19, 2006

(30) Foreign Application Priority Data

Apr. 13, 2005 (TW) .............................. 94111606 A

(51) Int. Cl.
*G11B 17/00* (2006.01)
(52) U.S. Cl. .................................................. 360/97.01
(58) Field of Classification Search ............... 360/97.01; 361/684, 686
See application file for complete search history.

(56) References Cited

U.S. PATENT DOCUMENTS 5,574,625 A * 11/1996 Ohgami et al. .............. 361/684
5,841,632 A * 11/1998 Horii et al. .................. 361/686
6,295,569 B1 * 9/2001 Shimura et al. ............. 710/305
7,174,558 B2 * 2/2007 Kobayashi .................. 720/673
2006/0268528 A1 * 11/2006 Zadesky et al. ............. 361/728
2007/0063922 A1 * 3/2007 Kim et al. ................... 345/1.1

FOREIGN PATENT DOCUMENTS

TW 481329 3/2002

* cited by examiner

*Primary Examiner*—Angel A. Castro
(74) *Attorney, Agent, or Firm*—Jianq Chyun IP Office

(57) ABSTRACT

An improved structure for portable electronic device is presented using elastic material for building guide rails for support, protecting a mini storage device inside the portable device, and permitting the consumer, while using the portable electronic device, to protect the mini storage device from shock damage. The portable electronic device contains a casing. The casing further contains a containing space. The containing space connects to the exterior via an opening. The parallel side walls of the containing space, which also include a pair of guide rails, are perpendicular to the exterior. The guide rails are made of an elastic material. The mini storage device passes through the above opening, enters the casing, moves along the guide rails, and finally is placed inside the containing space.

19 Claims, 5 Drawing Sheets

SUPPORT STRUCTURE OF STORAGE DEVICE FOR PORTABLE ELECTRONIC DEVICE

CROSS-REFERENCE TO RELATED APPLICATION

This application claims the priority benefit of Taiwan application serial no. 94111606, filed on Apr. 13, 2005. All disclosure of the Taiwan application is incorporated herein by reference.

BACKGROUND OF THE INVENTION

1. Field of the Invention

The present invention relates to an improved structure for portable electronic device. In particular, the present invention relates to a shockproof and vibration proof structure for mini storage device inside portable electronic device.

2. Description of the Related Art

In today's information age, mankind has become more and more dependent upon electronic products. In accordance with today's needs for faster speed, higher performance, and miniaturization, various portable electronic devices have become mainstream products, such as mobile phone, personal digital assistant (PDA), and MP3 player. Portable electronic device has become a crucial part of the modern lifestyle and working environment, and is also heading towards a multi-functional trend, making the portable device becoming a multimedia system, not only for listening to music, but also for watching movies, images, and at the same time, having camera and video functions.

In accordance with the needs for higher memory storage requirements for portable electronic devices, the mini storage devices such as the Mini-HD, with capacity as high as 20 G, 30 G, and above, indeed have large amounts of storage space. They have already been adopted by portable electronic devices, thus becoming a popular memory storage for portable electronic devices. As well already known, a hard disk is highly vulnerable to impact and shock damages from external sources. Particularly, when the hard disk is in accessing data, the impact from the external force is more severe. Therefore, an ability to protect the mini storage device inside portable electronic device for preventing the effects of external impact and shock is becoming a concerning issue for design considerations in portable electronic devices.

A Taiwan Patent No. 481329 has disclosed an improved shockproof structure for hard disk. It includes a hard disk base, several pieces of rail supports with the slide rail, several springs, and pieces of elastic material. The aforementioned spring and a rail support hitching hook are suspended in the hard disk base. And also, several pieces of elastic material are disposed at an appropriate position between the hard disk base and the rail support, while only preserving the hard disk drive storage space and the heat dissipation space. The aforementioned slide rail is taken and anchored firmly at the sides of the hard disk drive. The hard disk drive slides into the rail support and inserting into the hard disk base, which also contains the shockproof structure.

Based on the above prior art, a conventional shockproof structure of hard disk includes four main components: slide rail, screw, rail support, and elastic material. By using the screw to secure the slide rails at the end region on two sides of the hard disk, combining the hard disk and the slide rail to place together inside the rail support, and relying on the elastic material which surrounds the outside of the rail support for absorbing external shock and vibration, the goal of hard disk protection can be reached. Such structural design, not only requires many components and have higher manufacturing cost during replacement of the hard disk drive, but also when the hard disk drive is necessary to be replaced, the hard disk drive is necessary to be taken out first and the screws are detached for releasing the slide rails on both sides of the hard disk drive. After replacement of hard disk drive, the screws are used again for affixing the slide rails on both sides of the new hard disk drive. Therefore, the hard disk drive replacement procedures wasting assembling time, as well as increasing assembly complexity and degree of difficulty.

SUMMARY OF THE INVENTION

It is an objective of the present invention to provide an improved structure for portable electronic device. Its structure includes the following advantages, characteristics, and functionalities:

The portable electronic device includes a casing, having a containing space. The containing space is connected to the outside world via an opening. The containing space is perpendicular to a set of guide rails disposed on both side walls, corresponding to the opening. The guide rail is made of elastic material. Thus, after a mini storage device passes the opening, it enters the casing along the guide rail and is disposed inside the containing space. As a result, the guide rail made from an elastic material can achieve the effect for absorbing shock and affixing capability. This allows for decreasing the number of components being used, and reducing the cost due to using excessive components in conventional design.

Using the improved structure for portable electronic device from the present invention, one can eliminate the conventional procedure of having to remove the screw first and replacing the hard disk, thus achieving the goals of elimination of screws and faster disassembly of mini storage device. Because the portable electronic device has a battery slot; therefore, during placement of a battery inside the battery slot connecting to the portable electronic device and removal of the battery slot and disconnecting from the portable electronic device, the memory storage device can be directly removed along the set of guide rails. As a result, the memory storage device replacement procedure is completed.

The present invention is using an elastic material for the guide rail for the portable electronic device for achieving the objective of using no screws for affixing the mini storage device. In addition, making use of the advantage of the elastic material for the guide rail to protect the mini storage device from damage due to external vibration and shock, thus providing smooth continuous operations.

To better understand the aforementioned advantages, characteristics, and functionalities, further details of the present invention, and further features and benefits thereof, are described below. The accompanying drawings, which are incorporated herein and form a part of the specification, illustrate the present invention and, together with the description, further server to explain the principles of the invention and to enable a person skilled in the pertinent art to make and use the invention.

DETAILED DESCRIPTION OF THE EMBODIMENTS

Figure 1A:
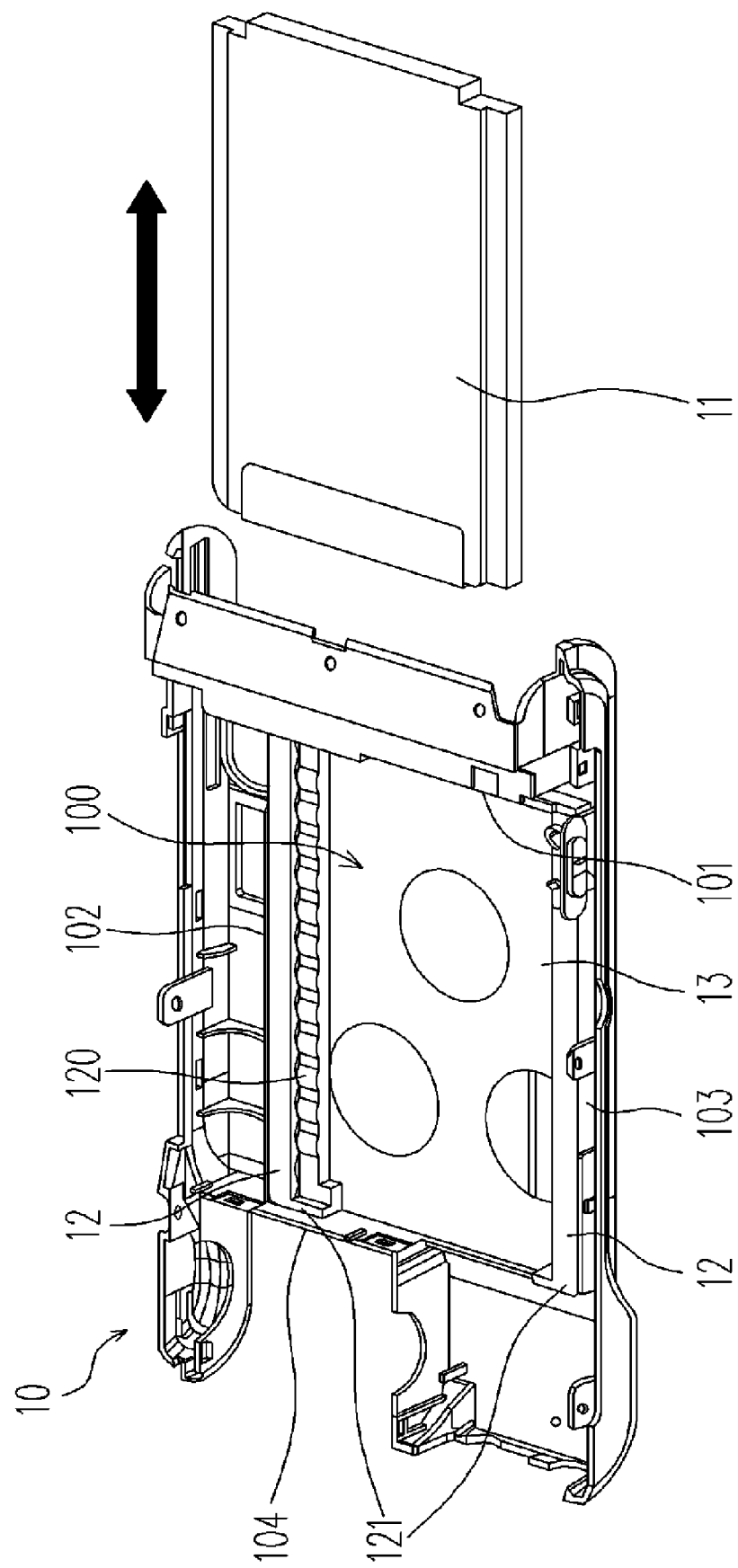
FIG. 1A to FIG. 1C are perspective views showing an embodiment of the present invention.
Figure 1B:
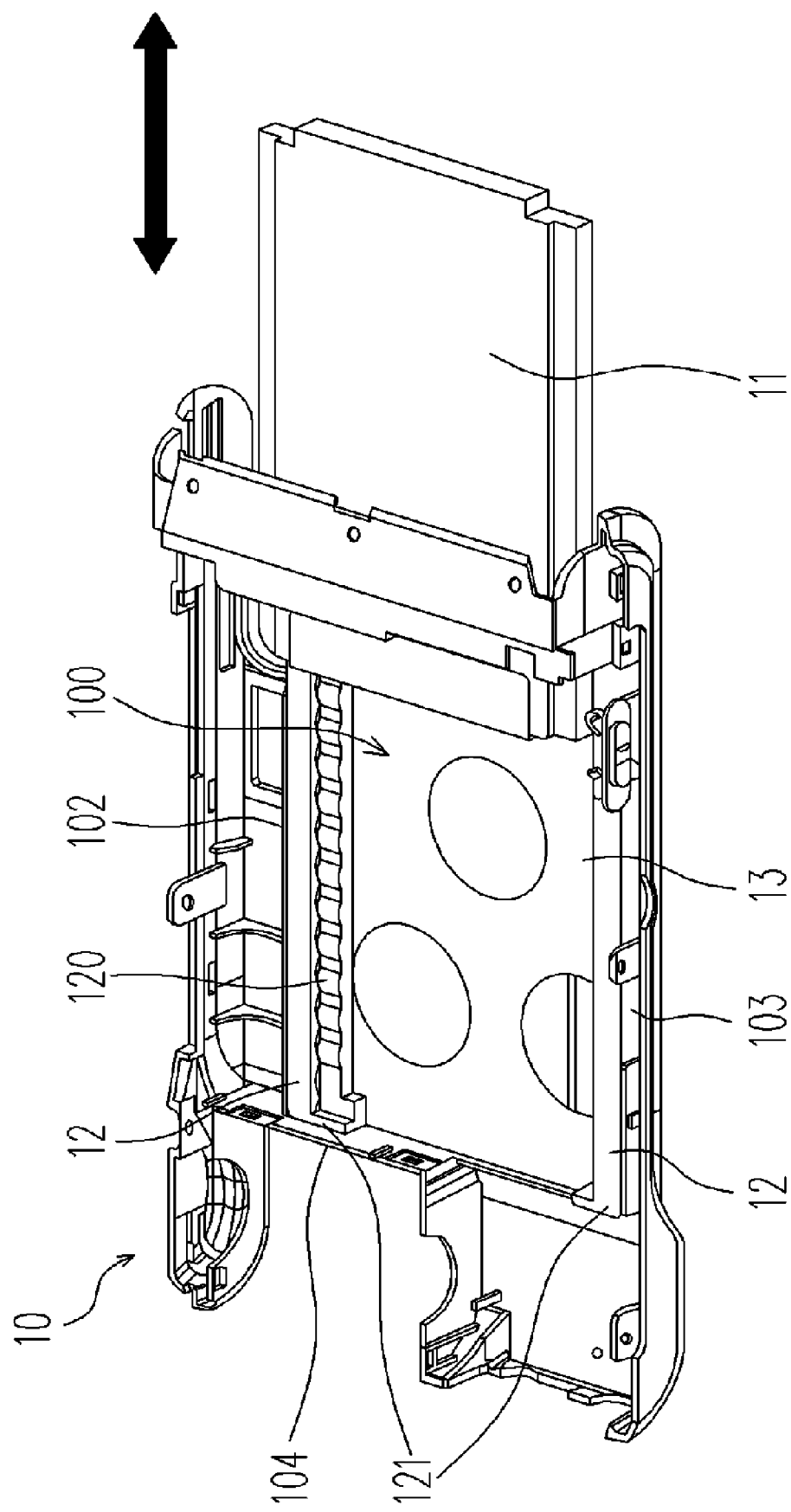
Figure 1C:
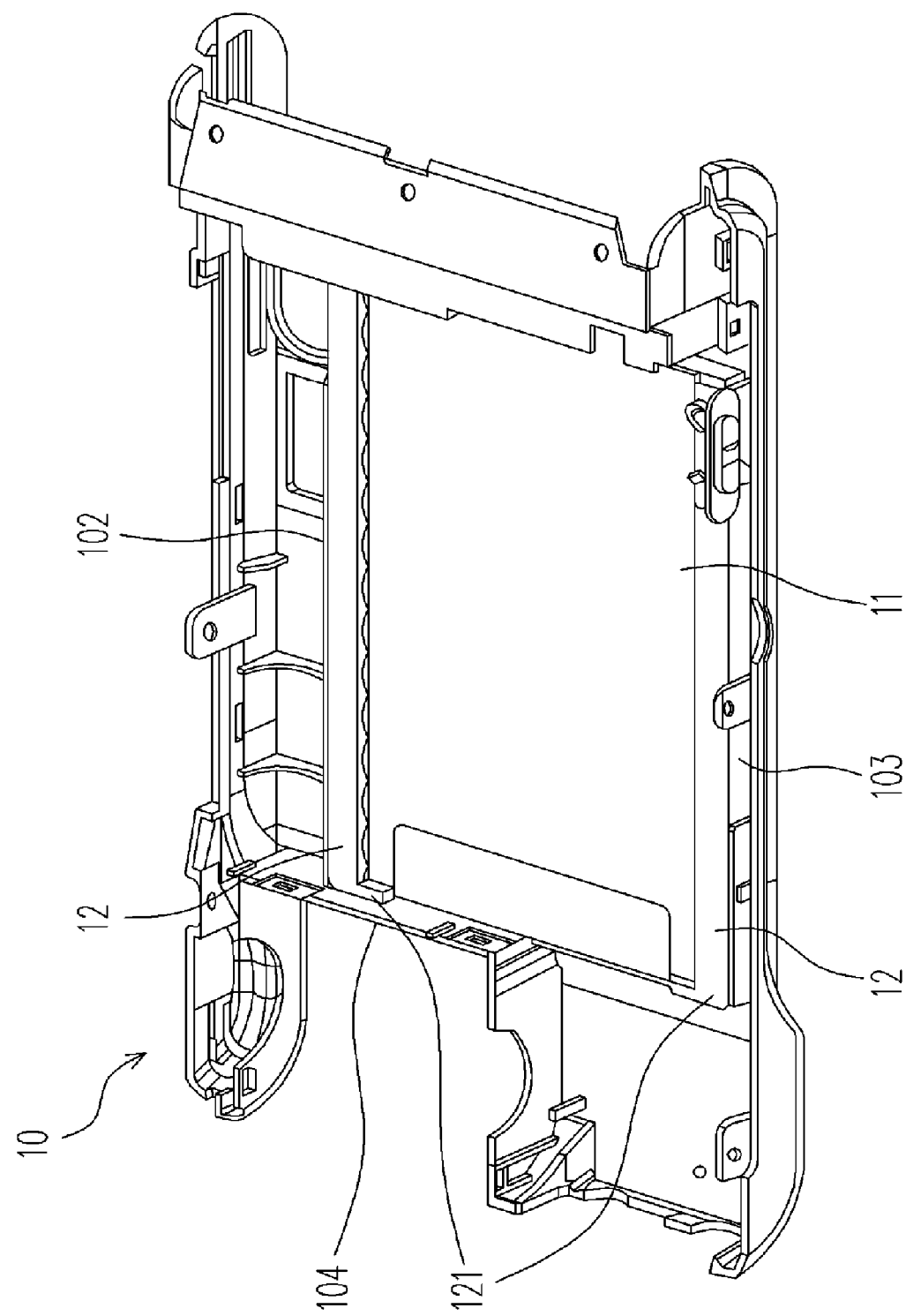

As shown from FIG. 1A to FIG. 1C, they illustrate perspective views for an embodiment of the present invention. For simplicity, an embodiment drawing is shown by omitting a portion of a casing 10, display screen, the circuit board, and nonessential descriptive items. A portable electronic device has the casing 10. The casing 10 has a containing space 100 for adapting a mini storage device 11. The containing space 100 is using an opening 101 for connecting to the exterior. A set of guide rails 12 are disposed within the containing space 100, on the corresponding side walls 102, 103 that are perpendicular to the opening 101. The guide rail 12 is made of, for example, an elastic material including rubber. The rubber itself contains excellent abrasion resistance and shock absorbing capabilities; therefore, it can ensure that the mini storage device 11 is safe inside the casing 10 of the portable electronic device, away from any harm due to outside shock and vibration. As we know, the mini storage device 11 that the typical portable electronic device often uses is a Mini-HDD. Whenever the mini storage device 11 is fetching data, it is most sensitive to outside shock and vibration which causes damage to the data or even worse, ruining sections of tracks. Thus by using the guide rail 12 made of rubber material, it can absorb external mechanical shock wave and ensure the safety requirement for the mini storage device 11 usage inside of the portable electronic device is met.

As a result of having a plurality of bulges 120 locating on the interior portions of the guide rail 12, wherein the rubber material and the guide rail 12 are formed in integration. The mini storage device 11 is allowed to conveniently passing through the opening 101 along the guide rail 12, entering into the casing 10, and placing within the containing space 100. The bulges 120 are also made of elastic material and are integrating into one piece with the guide rail 12. The bulge 120 is formed and repeated at a prescribed spacing at intervals along the entire span of the interior surfaces of the guide rail 12. Thus making the mini storage device 11 movement along the guide rail 12, during placement into the casing 10, it is to be affected by the abrasion resistance of the guide rail 12. The guide rail 12 abrasion resistance takes on the form of nodal abrasion mode instead of total contact frictional resistance mode for the entire span of the guide rail 12 for the mini storage device 11. Sliding the mini storage device 11 along the guide rail 12 for placing inside the casing 10 or moving in the opposite direction along the guide rail 12 for its removal does not encounter too much frictional resistance. At the same time, it can still provide adequate absorption of the shock and vibration for the mini storage device 11 and increases assembly convenience. For the time being, the set of guide rail 12 can further have a set of rail corner stops 121. The set of rail corner stops 121 is disposed inside the containing space 100 on a side panel 104 against the opening 101. Generally as shown in FIG. 1A to FIG. 1C, the rail corner stops 121 is a stopper, disposed inside the casing 10, preferable on the bottom plate 13, and for contacting the mini storage device 11 to stop the mini storage device 11 in the casing 10. The rail corner stops 121 are not necessary to be directly connected to the guide rail 12. The need for the elastic material is elastic material to absorb the shock. However, in one embodiment, at least one of the guide rails and the corresponding rail corner stop 121 as the stopper are formed to become one piece. Alternatively, in one embodiment, at least one of the guide rails contacts the corresponding rail corner stop 121 as the stopper. The shock is an outside shock or an external mechanical shock. Therefore, the mini storage device 11 slides along the set of guide rails 12 for placement inside the casing 10. During placement inside the containing space 100, the mini storage device 11 comes in contact with the set of rail corner stop 121, thus protecting the mini storage device 11.

Because the casing 10 is typically made of plastic materials, for strengthening durability and preventing shape distortion of the casing 10 due to external impact, a bottom plate 13 is added on the bottom of the casing 10. It is for improving the strength of the casing 10 and for protecting the electronic components inside the portable electronic device.

Figure 2A:
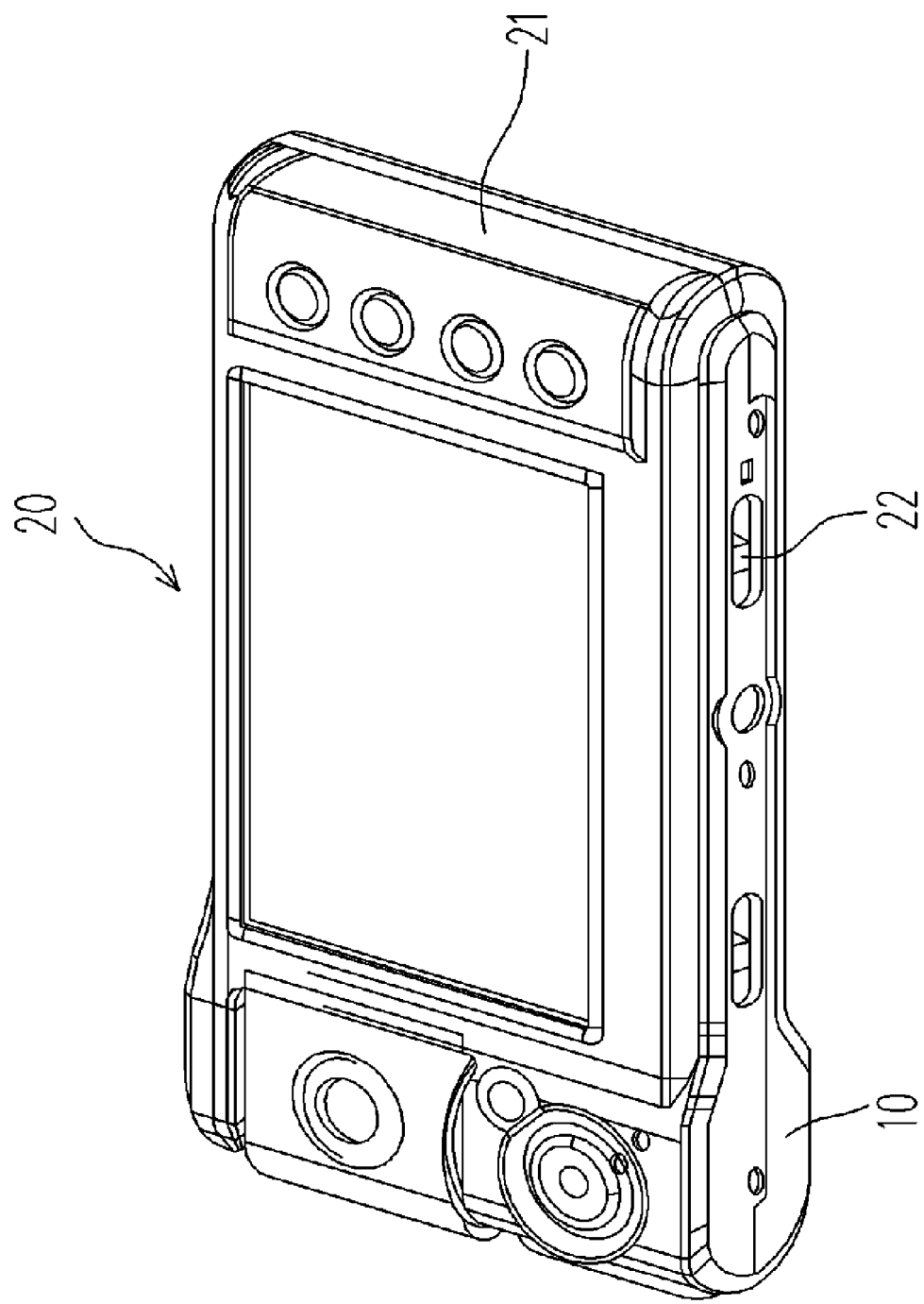
FIG. 2A to FIG. 2B are perspective views for a portable electronic device in an assembly procedure, according to an embodiment of the present invention.
Figure 2B:
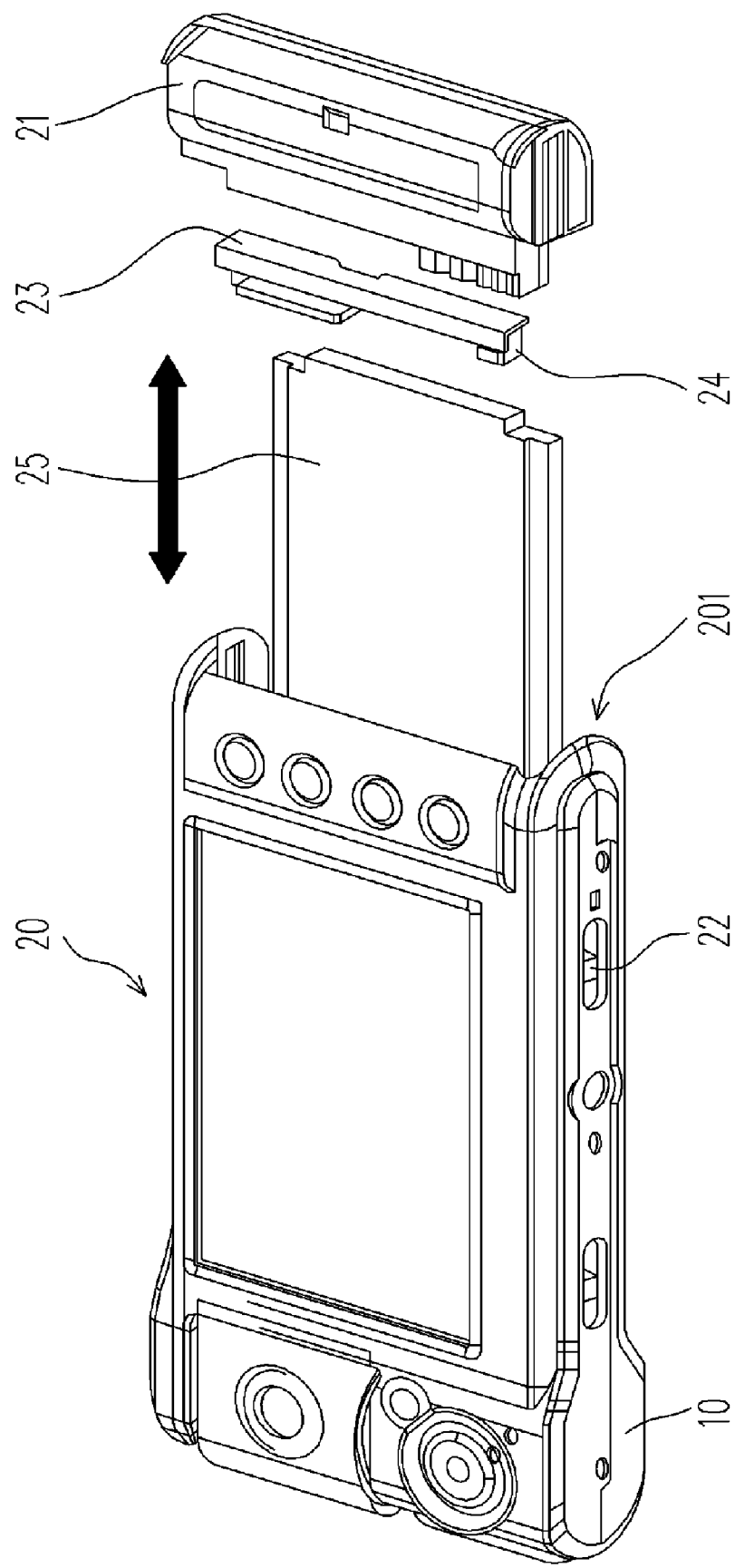

In reference to FIG. 1A, FIG. 2A, and FIG. 2B, FIG. 2A and FIG. 2B illustrate a portable electronic device in assembly operation, according to an embodiment of the present invention. The casing 10 and the mini storage device 11 as illustrated in the accompany drawings are similar to those shown in FIG. 1A. Therefore, they share corresponding component names and numbers. Among the included items, the portable electronic device 20 includes a battery slot 201. And the battery slot 201 is connected to the opening 101, and is led through to the exterior. The casing 10 contains a set of guide rails 12. The portable electronic device 20 includes a battery 21. The battery 21 is for providing the electric power for the portable electronic device 20. The mini storage device 11 along the set of guide rails 12 is disposed within the portable electronic device 20. The set of guide rails 12 is made of an elastic material. One can depress a battery latch mechanism 22 to separate and remove the battery 21 from the portable electronic device 20. The memory storage device 11 can be directly removed from the set of guide rail 12, and be separated from the portable electronic device 20, without needing to remove the screw and changing the memory storage device 11. As a result, fast-disassembly without screws is achieved.

For ensuring better protection of the mini storage device 11 while inside the portable electronic device 20, a cover 23 is added between the mini storage device 11 and the battery 21. A cover pad 24 is added to the cover 23 disposed above and near the mini storage device 11. The cover pad 24 is made of elastic material, such as rubber. The cover pad 24 combining with the set of guide rails 12 allows the mini storage device 11, irregardless of the direction of the vibration or shock, to absorb the impact by using the guide rails 12 and the cover pad 24. It results in better protection of the memory storage device 11 inside the portable electronic device 20.

In summary, the main original objective of the present invention includes an improved structure for portable electronic device. The portable electronic device has the casing 10. The casing 10 contains a containing space 100. The containing space 100 is connected to the exterior via an opening 101. A set of guide rail is disposed on the two side walls within the containing spacer and perpendicular to the opening. The guide rail 12 is made of elastic material. The mini storage device 11, once passing through the opening 101, moves along the guide rail 12, enters the casing 10, and places within the containing space using the guide rail 12 made from elastic material. The guide rail 12 is beneficial for providing the shock absorption and reduction of components for the portable electronic device. In addition, the present invention allows for faster removal of the mini storage device 11, and the elimination of screws.

Although an embodiment of the present invention is shown, it will be apparent to those skilled in the art that various modifications and variations can be made to the structure of the present invention without departing from the scope or spirit of the invention. In view of the foregoing, it is intended that the present invention cover modifications and variations of the present invention provided they fall within the scope of the following claims and their equivalents.

What is claimed is:

1. A structure of portable electronic device, wherein the portable electronic device comprises a casing, the casing has a containing space and an opening connected to a battery slot, the structure comprising:
 a set of guide rails, disposed within the containing space at two side walls perpendicular to the opening and used to absorb a shock, wherein the set of guide rails is elastic material and a mini storage device is moved along the set of guide rails and adapted into the containing space after the mini storage device passes through the battery slot and the opening; and
 a stopper, disposed at a bottom wall of the containing space to stop the mini storage device in the containing space, wherein the stopper is elastic material to absorb the shock.

2. The structure of claim 1, wherein the set of guide rails comprises of a plurality of bulges at inner sides.

3. The structure of claim 2, wherein the stopper is operated with the set of guide rails as a set of rail corner stops disposed on a lateral side opposite to the opening.

4. The structure of claim 3, wherein the bulges and the rail corner stops are made of elastic material.

5. The structure of claim 3, wherein the set of guide rails, the bulges, and the set of the rail corner stops combine to form an integrated structure for manufacture.

6. The structure of claim 3, wherein the set of guide rails, the bulges, and the set of the rail corner stops are made of rubber.

7. The structure of claim 1, wherein the mini storage device includes a mini hard disk drive.

8. The structure of claim 1, further comprising a bottom plate at a bottom of the casing.

9. The structure of claim 1, wherein at least one of the guide rails and the stopper are formed to become one piece.

10. The structure of claim 1, wherein at least one of the guide rails contacts the stopper.

11. The structure of claim 1, wherein the shock is an outside shock or an external mechanical shock.

12. A portable electronic device, comprising:
 a casing, comprising an opening with a battery slot to connect to an exterior;
 a set of guide rails, disposed inside the casing and used to absorb a shock, wherein the set of guide rails is made of elastic material;
 a mini storage device, disposed in the casing, wherein the mini storage device is disposed on the set of guide rails at both sides;
 a stopper, disposed inside the casing and for contacting the mini storage device to stop the mini storage device in the casing, wherein the stopper is elastic material to absorb the shock; and
 a battery, disposed at a battery slot and integrated with the portable electronic device, wherein when the battery is detached from the battery slot and separated from the portable electronic device, the mini storage device has a path to detach from the casing by directly sliding out via the guide rail and passing through the opening and the battery slot.

13. The portable electronic device of claim 12, further comprising a cover disposed between the battery and the mini storage device.

14. The portable electronic device of claim 13, further comprising a cover pad on the cover at a location near the mini storage device.

15. The portable electronic device of claim 14, wherein the cover pad includes elastic material.

16. The portable electronic device of claim 15, wherein the elastic material for the cover pad is rubber.

17. The portable electronic device of claim 15, wherein at least one of the guide rails and the stopper are formed to become one piece.

18. The portable electronic device of claim 15, wherein at least one of the guide rails contacts the stopper.

19. The portable electronic device of claim 15, wherein the shock is an outside shock or an external mechanical shock.

* * * * *